July 16, 1957
E. H. HULL
2,799,445
HIGH SPEED ROTOR
Filed Dec. 12, 1955
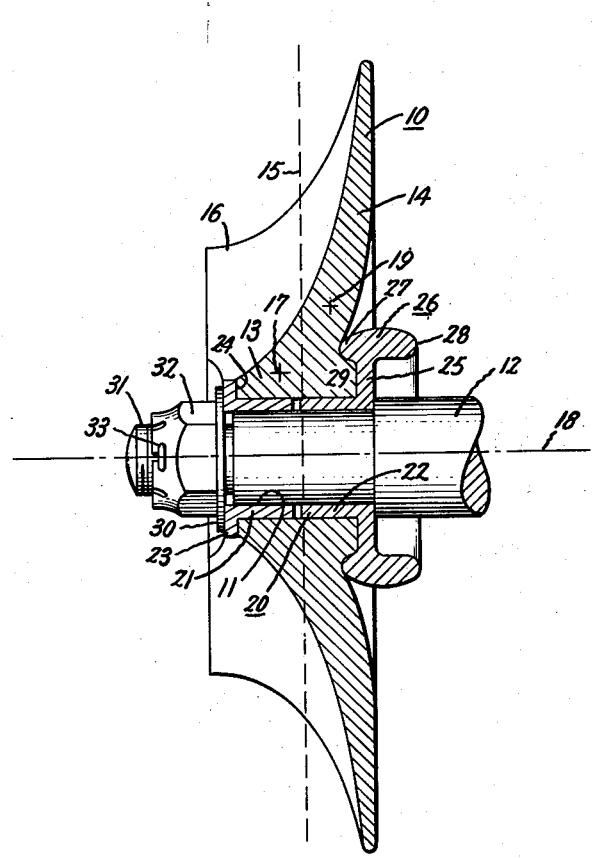
Inventor:
Edwin H. Hull,
by Paul A. Frank
His Attorney.

2,799,445
HIGH SPEED ROTOR

Edwin H. Hull, Scotia, N. Y., assignor to General Electric Company, a corporation of New York Application December 12, 1955, Serial No. 552,460

5 Claims. (Cl. 230—134)

My invention relates to high speed rotors and more particularly to a bushing arrangement for the shaft bore of such rotors.

The present invention constitutes an improvement over the impeller bushing arrangement shown in U. S. Patent 2,441,432 to H. P. McGee issued May 11, 1948. In this patent, a one-piece bushing for the shaft bore of a rotor is disclosed which comprises a sleeve engaging the inner surface of the shaft bore, a radially extending flange secured to the end of the sleeve, and an annular shoulder at the outer circumference of the flange, the shoulder extending axially from the flange and engaging the outer surface of a shoulder on the rotor. Alternatively, the flange member may be integral with or affixed to the shaft, thus eliminating the necessity of the bushing.

It is desirable to provide a rotor bushing which maintains a tight shaft fit during high speed rotation of the impeller. In previous devices, a one-piece bushing was employed which had an annular shoulder engaging a shoulder on the impeller. The invention of the present application provides a novel bushing which has a counterweight member to provide a taper press fit between the bushing shoulder and the impeller.

Accordingly, it is an object of the invention to provide a new and improved bushing for a high speed rotor.

It is another object of the invention to provide an improved bushing in which a counterweight member is employed to reverse the direction of stress in an impeller.

It is a further object of the invention to provide an improved bushing which tends to eliminate impeller distortion during high speed rotation.

In carrying out my invention in one form, a flanged two-piece bushing with an annular member is mounted on a shaft to provide a taper press fit between the member and the impeller.

These and various other objects, features and advantages of the invention will be better understood from the following description taken in connection with the accompanying drawing in which:

The single figure is a sectional view of a high speed rotor which embodies my invention.

In the single figure of the drawing, a high speed rotor is disclosed which comprises a centrifugal impeller 10 with an axial bore 11 mounted on a suitable shaft 12. Impeller 10 has a first hub portion 13 and a second hub and web portion 14, which portions may be considered to be separated by an imaginary plane represented by dotted line 15. A plurality of circumferentially spaced, radially arranged blades 16 are secured to the impeller portions in a manner which is well known to the art. Hub portion 13 has a cross section area with a center of gravity located approximately at the point 17. This portion of impeller 10 has a comparatively small mass and radius of gyration, the latter being substantially the distance from point 17 to the axis 18. Hub and web portion 14 has a cross section with a center of gravity represented by a point 19. This second portion has a mass and radius of gyration appreciably greater than does hub portion 13.

Impeller 10 is provided with a two-piece bushing 20 which comprises two adjacent cylindrical sleeves 21 and 22. Sleeve 21 has a radially extending flange 23 adjacent a recessed portion 24 of hub 13 to hold impeller 10 on shaft 12. Sleeve 22 has a radially extending flange 25 adjacent hub portion 13. Flange 25 has an annular member 26 at its outer circumference to provide a pair of annular shoulders 27 and 28. Shoulder 27, which extends axially from flange 25 toward hub and web portion 14, has an inner circumferential surface engaging frictionally the outer surface of an axially extending shoulder 29 on portion 14. Shoulder 28 extends axially from flange 25 in the opposite direction to shoulder 27 to provide a counterweight which pivots on flange 25 during operation of impeller 10 to press shoulder 27 against shoulder 29. If it is desired, a one-piece bushing can be employed. A circular washer 30 is placed on the reduced threaded shaft portion 31 of shaft 12 adjacent flange 23 of sleeve 21. An impeller nut 32 is threaded on shaft portion 31 against washer 30 while a suitable locking device, such as a cotter-pin 33 is used to prevent relative rotation between nut 32 and shaft portion 31.

I have discovered that when an impeller is rotated at high speed a characteristic type of deformation takes place in which hub and web portion 14 tends to move outwardly and forward from shaft 12 while hub portion 13 tends to contract. Hub portion 13 is held tightly on shaft 12 by flange 23, washer 30 and nut 32. Shoulder 28 provides a counterweight which pivots outwardly on flange 25 to press shoulder 27 inwardly on shoulder 29 of hub portion 14 to provide a tight frictional engagement between impeller 10 and bushing 20. It is evident from the drawing that the above-mentioned counterweight principle may be obtained either by having shoulder 28 of a greater mass than shoulder 27, or by having the distance of the center of gravity of shoulder 28 further removed from the pivot point, i. e., flange 25, than the corresponding distance of the center of gravity of shoulder 27. Impeller 10 runs true without leaving shaft 12 to maintain mechanical balance for the rotor.

As will be apparent to those skilled in the art, the objects of my invention are attained by applying to a rotor bore having a surrounding shoulder a counterweight principle, in the form of an annulus of unequal mass portions disposed on opposite sides of a flange, with the portion of lesser mass overlying the surrounding shoulder, which annulus flexes about its mounting flange under the action of centrifugal force to increase the radius of the heavier mass portion, and to restrain an increase in the radius of the portion of lesser mass and the shoulder upon which it is mounted.

While other modifications of this invention and variations of apparatus which may be employed within the scope of the invention have not been described, the invention is intended to include all such as may be embraced within the following claims.

What I claim as new and desire to secure by Letters Patent of the United States is:

1. A high speed rotor subject to elastic deformation under centrifugal stresses in operation which comprises a first rotor portion having a comparatively small mass and radius of gyration, a second rotor portion secured to and axially adjacent the first portion and having a substantially greater mass and radius of gyration, an axially extending shoulder formed externally on the said second rotor portion, the central part of both portions defining a bore for mounting the rotor on a supporting shaft, a bushing for the shaft bore, said bushing comprising at least a single sleeve with a substantially cylindrical outer surface frictionally engaging the inner surface of the shaft bore, a radially extending flange secured to the end of the sleeve adjacent the second rotor portion, and an annular member at the outer circumference of the flange, said member comprising a pair of adjacent annular shoulders of unequal mass, the shoulder of lesser mass extending axially from the flange toward the second rotor portion and defining an inner surface frictionally engaging the outer surface of the said axially extending shoulder formed on the second rotor portion, the other of said shoulders having the greater mass extending axially from the flange in the opposite direction from said first shoulder.

2. A high speed rotor subject to elastic deformation under centrifugal stresses in operation which comprises a first rotor portion having a comparatively small mass and radius of gyration, a second rotor portion secured to and axially adjacent the first portion and having a substantially greater mass and radius of gyration, an axially extending circumferential shoulder formed externally on the said second rotor portion, the central part of both portions defining a bore for mounting the rotor on a supporting shaft, a two-piece bushing for the shaft bore, said bushing comprising two adjacent sleeves with substantially cylindrical outer surfaces frictionally engaging the inner surface of the shaft bore, a radially extending flange secured to the end of the sleeve adjacent the second rotor portion, and an annular member at the outer circumference of the flange comprising a pair of adjacent annular shoulders of unequal masses, the shoulder of lesser mass extending axially from the flange toward the second rotor portion and defining an inner circumferential surface frictionally engaging the outer surface of said axially extending circumferential shoulder formed on the second rotor portion, the shoulder of greater mass extending axially from the flange in the opposite direction from said first shoulder.

3. A high speed rotor subject to elastic deformation under centrifugal stresses in operation which comprises a first rotor portion having a comparatively small mass and radius of gyration, a second rotor portion secured to and axially adjacent the first portion and having a substantially greater mass and radius of gyration, an axially extending circumferential shoulder formed externally on said second rotor portion, the central part of both portions defining a bore for mounting the rotor on a supporting shaft, a two-piece bushing for the shaft bore, said bushing comprising two adjacent sleeves with substantially cylindrical outer surfaces frictionally engaging the inner surface of the shaft bore, a radially extending flange secured to the end of the sleeve adjacent the first rotor portion, a second radially extending flange secured to the end of said second sleeve adjacent the second rotor portion, and an annular member at the outer circumference of said second flange, said member comprising a pair of adjacent annular shoulders having unequal masses, the shoulder having the lesser mass extending axially from the second flange toward the second rotor portion and defining an inner circumferential surface frictionally engaging the outer surface of the said axially extending circumferential shoulder formed on the second rotor portion, the shoulder of greater mass extending axially from the second flange in the opposite direction from said first shoulder.

4. Means for the prevention of bore deformation of a shaft mounted high speed rotor comprising in combination, at least one axially extending surface on said rotor, a flange associated with said shaft and positioned adjacent said surface, a pair of shoulders arranged one on each side of said flange to flexibly pivot on said flange under the action of centrifugal force, one of said shoulders overlying said axially extending surface, and the other of said shoulders extending away from said flange, whereby rotation of said rotor causes a pivoting of said shoulders to restrict radial movement of said axially extending surface on said rotor.

5. A high speed non-deforming rotor having a bore therein comprising in combination, an annular shoulder extending axially from said rotor adjacent said bore, a bushing in said bore, said bushing having a radial flange extending adjacent to said axially extending shoulder, a pair of adjacent shoulders extending oppositely one on each side of the said flange, and arranged to flexibly pivot thereon under the action of centrifugal force, one of said shoulders having a lesser mass than the other and positioned to overlie the said axially extending shoulder, the other of said shoulders extending oppositely away from said flange to be moved radially outward by centrifugal force whereby the other of said shoulders is moved inwardly to compress the said axially extending shoulder.

No references cited.